May 24, 1938.    LE GRAND S. WHEDON ET AL    2,118,689
AUTOMOBILE SEAT
Filed Nov. 20, 1934
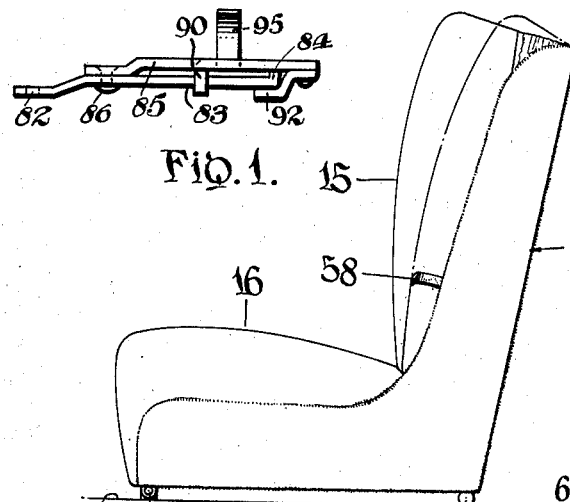
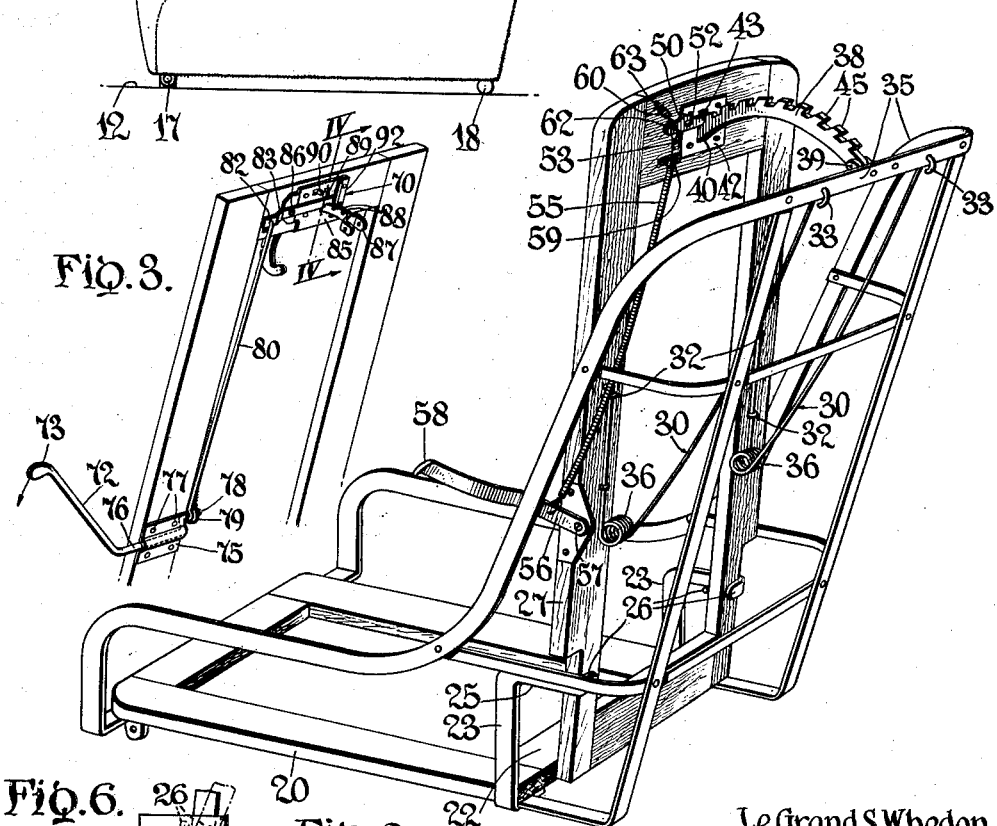
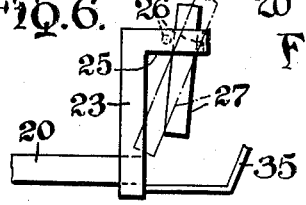
Le Grand S. Whedon
Albert A. Grinnell,
INVENTORS
BY
Beau A. Brooks
ATTORNEYS Patented May 24, 1938

2,118,689

UNITED STATES PATENT OFFICE 2,118,689

AUTOMOBILE SEAT

Le Grand S. Whedon and Albert A. Grinnell, Medina, N. Y., assignors, by mesne assignments, to Le Grand S. Whedon, Medina, N. Y.

Application November 20, 1934, Serial No. 753,967

4 Claims. (Cl. 155—162)

This invention relates to adjustable seats for incorporation in vehicle constructions or for other constructions and it has particular relation to a seat structure wherein seat supporting members, seat back and seat bottom can be relatively moved to conform readily to various sizes and physical characteristics of different types of persons and in such manner that various sized persons can assume upright, reclining or semi-reclining positions with ease and comfort.

The invention is principally concerned with the construction of supporting and adjusting elements for the seat back wherein an individual can manipulate a handle or knob to release adjusting elements, and by pressing against the seat back or relieving pressure thereon, the latter can be adjusted to the convenient or desirable angle to the vertical and at the desired position of forward or rearward movement. This type of seat back is particularly adapted to be incorporated in seating structures similar to that described in a co-pending application Serial No. 694,819, filed October 23, 1933, for Seat construction, wherein the seat bottom is described as being movable forwardly and upwardly, or rearwardly and downwardly, and slightly tiltable from its substantially horizontal position, while cooperating with a seat back that is engaged therewith for relative and concurrent movement. The present invention provides for greater simplicity and flexibility of operation of the elements controlling the adjusting mechanism of the seat back.

In the drawing:

Fig. 1 is a diagrammatic side elevation of a seat structure having the invention incorporated therein;

Fig. 2 is a perspective of frame and adjustment controlling elements of the seat structure;

Fig. 3 is a fragmentary perspective of a seat back having another form of control mechanism incorporated therein;

Fig. 4 is a central vertical section taken substantially along the line IV—IV of Fig. 3;

Fig. 5 is a plan, on a larger scale, of a latching device included in the invention; and Fig. 6 is a fragmentary side elevation of adjacent portions of a seat back frame and seat bottom frame.

In practicing the invention a seat structure 10 is installed upon a suitable support 12 which can be in the form of a vehicle floor, or the like, and includes seat back 15 and seat bottom 16. The front portion of the seat structure 10 is pivotally connected, as indicated at 17, to the support 12 and a roller or projection 18 carries rear portions of the seat structure upon the support. Thus the structure can be tilted forwardly about the pivot 17.

Framework 20 forming the lower portion of the seat bottom has a rear frame member 22 contiguous to which the lower rear portion of the seat back is disposed, and the rear of the framework 20 is provided with bracket arms 23 that have rearwardly extending angular portions 25. Inwardly directed guiding projections 26 formed upon the rear ends of each portion 25 slidably receive between them a lower rear portion of a frame 27 incorporated in the seat back, and thus the lower portion of the seat back is maintained in proper relation to the adjacent portion of the seat bottom. The lower edge of the frame 27 is at an elevation above the rear upper surface of the frame 20 of the seat bottom.

Torsion springs 30 having fastening devices 32 connecting end portions thereof to the rear frame members 27 of the seat back have their opposite end portions connected by means of fastening devices 33 to framework 35 of the supporting seat structure 10. The seat bottom frame 20 is carried as a rigidly assembled part of the framework 35. It will be observed that the end portions of the torsion springs diverge upwardly and that coils 36 at the intermediate portions of the torsion springs are located adjacent the intermediate portion of the seat back. This frame support or framework 35 includes a substantially vertically disposed section or element located rearwardly in spaced relation from the seat back frame 27, and further includes lower portions extending substantially horizontally into rigidly connected relation with the front and rear portions of the seat bottom frame 20. This supporting frame or framework 35 is thus designed to serve as a support for both the seat bottom frame and the seat back frame. Also, portions of the upwardly projecting rear end portions of the springs 30 rest against transverse structure of the framework 35 at locations below the fastening devices 33. These torsion springs are normally under tension and, in addition to supporting the seat back upon the framework 35, they constantly exert force tending to urge the seat back in a forward direction. The coils also provide a yieldable hinge-like connection between the seat back and the framework, and hence, in selecting a desired position for adjustment, the seat back can be moved in tilting motions either backwardly or forwardly about these coils in addition to the bodily movement upwardly or downwardly to various elevations in response to the action of the springs when the ends of the latter are moved toward or away from each other. An individual seated upon the seat structure can overcome the forward urge of the torsion springs against seat back 15 by exerting backward pressure against the seat back, and hence, the proper position of adjustment for maximum comfort, as to the seat back, can be assumed conveniently and with ease before locking the back structure in a manner to be described.

In controlling the movement of the seat back 15 with respect to the supporting framework 35, an arcuate rack arm 38 that has a pivotal connection 39 securing it at one end to the frame support, is so mounted that its other end extends through a slot 40 formed in a plate 42 that is secured to the rear portion of the seat back. The rear of the seat back is recessed, as indicated at 43, in order to provide for extension of the arm through the slot into the seat back during movements of the latter incidental to adjustments. The lower surface of the rack arm 38 rests slidably upon the lower wall of the slot.

Rack teeth 45 are formed upon the upper side of the rack arm and one end of a latch 50 that has an intermediate pivot connection 52 securing it to the plate 42 at the rear of the seat back, engages between two adjacent teeth 45 of the rack to lock the seat back in various positions of adjustment. The end portion of the latch opposite its rack-engaging end has a flexible actuator 53 connected thereto that is incased in a flexible tube 55 and is also connected to an intermediate portion of a lever 56 that is pivoted, as indicated at 57, to a side portion of the seat back frame. The lever projects forwardly and presents a knob or handle 58 at the side of the seat at a location convenient for actuation by a person seated upon the seat structure. The tube 55 is secured to the seat back frame by means of brackets 59 mounted upon the latter.

By manipulating the lever 56 the latch is released from the teeth of the rack and the springs urge the seat back forwardly to the desired position of adjustment and then the lever is released to permit the latch to resume its engagement with the rack.

One end of a spring 60 has a connection 62 upon the latch 50 and its other end has a connection 63 upon the frame. This spring is normally under tension and always urges the latch into engagement with the rack when the lever is released.

The flexibility and resiliency of the torsion springs provide for movement of the seat back with respect to the seat bottom, and the lower frame portions 27 of the seat back are slidable against and guided by the bracket arm extensions 25—26 that extend rigidly from the seat bottom to insure proper bodily movement of the lower portion of the seat back in response to various adjustments of the latter. The arrangement thus provides a floating seat back.

In the arrangement shown in Figs. 3 and 4, the seat back frame 27 is arranged substantially according to the previous description and showing in the other figures. However, a different form of controlling device 70 is shown in Figs. 3 and 4 and this device includes a crank-like lever 72 having a manually operable finger piece 73 to facilitate its pivotal movement in a bearing plate 75 that carries an intermediate bearing portion 76 of the lever. Suitable fastening devices 77 secure the plate to the frame 27.

A crank arm 78 of the lever has a pivotal connection 79 to the lower end of an upright rod 80 which has its upper end connected, as indicated at 82, to an end portion of a latch 83 having a spacing lug 84 formed thereon. A stamped plate 85 rigidly secured to the rear side of the upper portion of the frame 27 has a rigid support 86 upon which an intermediate portion of the latch 83 is pivoted.

A rack arm 87 for operation in this arrangement is constructed in substantially the same form as the rack arm 38 and it is provided with rack teeth 88 between two of which the latch 83 is normally engaged. This rack arm is adapted to be connected to the frame 35 in the same manner as that shown in Fig. 2, and its free end extends through registering slots 89 formed in the plate 85 and frame 27. A portion of the plate 85 is stamped out to form a stop lug or flange 90 located in the path of pivotal movement of the latch 83 to limit upward movement of the latter.

The end of the plate 85 adjacent the slots 89 is provided with a flanged portion 92 overlapping the end of the latch and preventing outward movement thereof when force is applied to the rack arm tending to withdraw it from the slots while it is engaged with the latch.

In stamping the sheet material of which the plate 85 is formed, a flange or tongue 95 is provided incidentally to the formation of the slot 89 and this tongue is bent rearwardly to a position overlying the upper rack edge of the rack arm 87 and is of such length and shape as to overlie in slightly spaced relation a notch between two of the rack teeth 88. Thus the rack arm is confined in a relatively restricted path of movement through the plate 85 and frame 27, and the teeth are prevented from being accidentally caught in any of the frame or plate elements.

By manipulating the finger piece 73 the latch 83 is pivoted into or out of engagement with the rack teeth 88 for the purpose of adjusting the seat back to various forward and rearward positions. The spacing lug 84 provides for a relatively small bearing surface of the latch 83 upon the surface of the plate and insures easier operation.

Although more than one form of the invention has been shown and described in detail, it will be apparent to those skilled in the art that the invention is not so limited but that various changes may be made therein without departing from the spirit of the invention or from the scope of the appended claims.

We claim:

1. In a seating structure having a seat bottom frame, a floating seat back frame tiltably adjustable relative to the seat bottom frame, a substantially vertical support disposed rearwardly of the seat back frame adjacent thereto, means connecting the seat bottom frame and vertical support in assembled relation, torsion springs disposed between the seat back frame and support, said torsion springs including intermediate coils and opposite extensions, one extension of each spring being connected to the seat back frame at a location spaced from the coils thereof, the other extension of each spring being connected to the support at a location spaced from the coils thereof, said springs suspending the seat back frame in yieldably movable relation adjacent the seat bottom frame and free from positive attachment to the latter, and means connected to the rearward support and to the seat back frame for releasably securing the latter in various rearwardly and forwardly tilted adjusted positions of adjustment with respect to the support and seat bottom frame.

2. In a seat arrangement, a supporting frame having a seat bottom frame, a seat back frame movable tiltably relative to the seat bottom frame, said seat bottom frame having means normally loosely and slidably receiving a portion of the seat back frame to facilitate the tiltable relation, said supporting frame having a substantially vertical section disposed adjacent the seat back frame, torsion springs each including an intermediate coil with end portions extending from said coil and said torsion springs resiliently suspending the seat back frame for forwardly and rearwardly tiltable adjustable motion, means for connecting the extending portions of each spring to the seat back frame and to said section of the supporting frame, said torsion springs normally being under tension and urging the seat back frame away from said vertical section of the seat bottom frame, said springs and said back receiving means of the seat bottom frame maintaining the seat back frame within predetermined limits of movement, and adjusting mechanism connected to the vertical section of the supporting frame and to the seat back frame for securing the latter in various positions within its limits of movement.

3. In a seat arrangement, a supporting frame having a seat bottom frame, a seat back frame element movable tiltably relative to the seat bottom frame, said seat bottom frame having means normally loosely and slidably receiving a portion of the seat back frame to facilitate tilting action of the latter, said supporting frame having a vertical section element disposed adjacent the seat back frame, resilient means suspendingly supporting the seat back frame upon said section of the supporting frame whereby the seat back is movable upwardly and downwardly and tiltably adjustable forwardly and rearwardly with respect to the supporting frame, a rack arm pivoted to one of said frame elements, the other frame element having means for receiving the rack arm movably therethrough, a latch pivoted to said other frame element and releasably engaging the rack arm, a lever mounted upon one of the frame elements remote from the latch and an elongate actuator connecting the latch to the lever whereby the latch is releasable from the rack in response to actuation of the lever.

4. In a seat arrangement, a supporting frame having a seat bottom frame incorporated therewith, a seat back frame tiltably adjustable relative to the seat bottom frame, said seat bottom frame having limiting means loosely and slidably receiving a portion of the seat back frame to facilitate the tiltable adjustment, said supporting frame having a vertical section disposed behind said back frame, resilient torsion springs suspendingly supporting the seat back frame upon the vertical section of the supporting frame whereby the seat back frame is bodily movable upwardly and downwardly and tiltably adjustable forwardly and rearwardly with respect to the supporting frame, said springs normally exerting force urging the seat back frame forwardly away from said vertical section of the supporting frame, a rack arm pivoted to the vertical section of the supporting frame, a latch pivoted to the seat back frame and releasably engaging the rack arm, a lever mounted upon the seat back frame, and a flexible actuator connecting the latch to the lever whereby the latch is releasable from the rack in response to actuation of the lever.

LE GRAND S. WHEDON.
ALBERT A. GRINNELL.